UNITED STATES PATENT OFFICE.

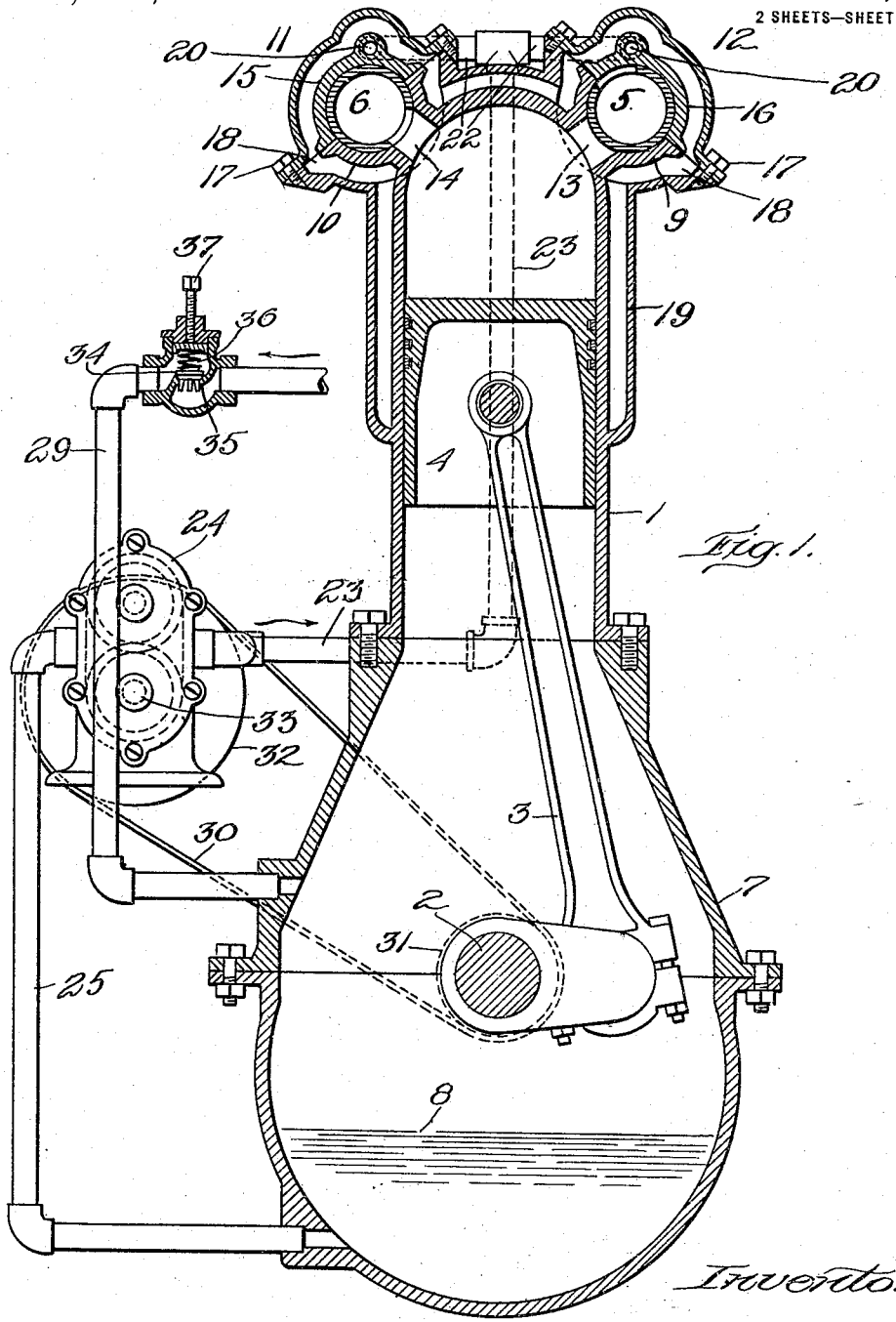

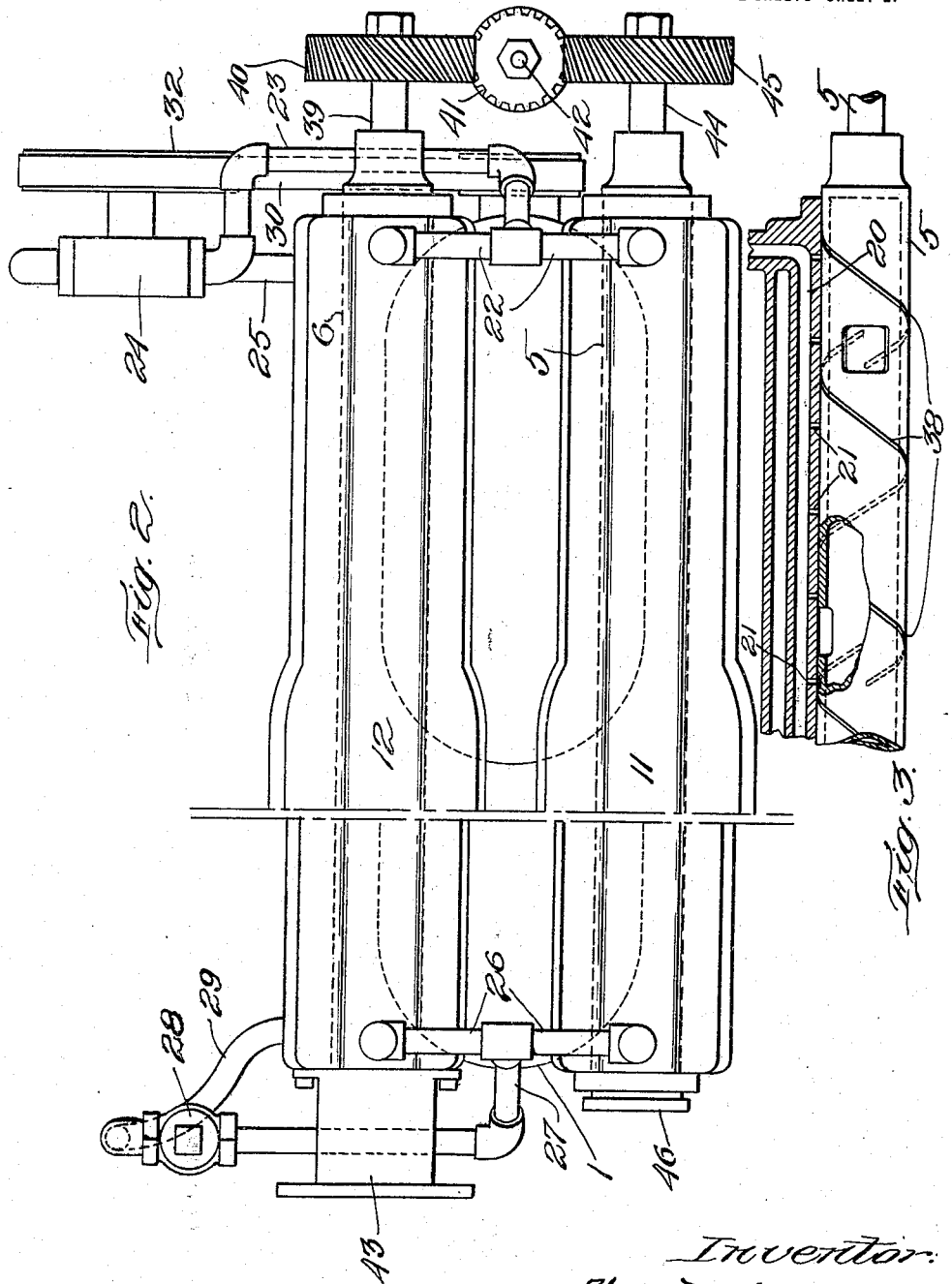

WALTER M. CUSICK, OF BOSTON, MASSACHUSETTS.

LUBRICATING APPARATUS.

1,200,413.  Specification of Letters Patent.  Patented Oct. 3, 1916.

Application filed January 4, 1916. Serial No. 70,161.

*To all whom it may concern:*

Be it known that I, WALTER M. CUSICK, a citizen of the United States, residing at Boston, in the county of Suffolk and State of Massachusetts, have invented new and useful Improvements in Lubricating Apparatus, of which the following is a specification.

My invention relates to lubricating apparatus for bearings and particularly to improvements in lubricating apparatus for the rotary valves of internal combustion engines.

In my Patent No. 1,142,312 is shown and described an internal combustion engine provided with hollow rotary inlet and exhaust valves mounted within valve housings connected by inlet and exhaust ports with the cylinders of the engine. In the engine of said patent, however, no provision was made for lubricating the rotary valves and the particular object of my present invention is to improve the construction of engines of this type by providing therein means for automatically lubricating the bearing surfaces of the valves and housings.

The invention consists of a lubricating apparatus for bearings embodying the peculiar features of construction and mode of operation set forth in the following description and particularly pointed out and defined in the claims at the close thereof.

In the accompanying drawings: Figure 1 is a vertical sectional view of an internal combustion engine constructed in accordance with my invention, Fig. 2 is a plan view, partly broken away, of the engine shown in Fig. 1, Fig. 3 is a detail hereinafter described.

Herein I have illustrated my invention as embodied in a multiple cylinder internal combustion engine of the four cycle type and in the accompanying drawings 1 represents one of the cylinders of the engine, 2 the crank shaft, 3 one of the connecting rods, 4 the piston with which the rod 3 is connected, 5 a hollow rotary inlet valve, 6 a hollow rotary exhaust valve and 7 the crank case whereof the bottom portion serves as a reservoir for a body of lubricating oil 8. The cylinders may, as shown, be cast in two pairs, both of which are integral with the lower sections 9 and 10 of the valve housings 11 and 12, said lower sections 9 and 10 being trough-like in shape and made with ports 13 and 14 communicating with the cylinders. The upper sections of the valve housings 11 and 12 are separable trough-like caps 15 and 16 fastened to the lower sections 9 and 10 by means of bolts 17. When the caps 15 and 16 are in position they, together with the lower sections 9 and 10, provide cylindrical chambers within which the valves 5 and 6 are free to rotate. The valve housings 11 and 12 are made with water jackets 18 which are in communication with the usual water jackets 19 of the cylinders, said water jackets 19 being provided with the usual inlet and outlet, not shown.

Each cap 15 and 16 is formed with an oil delivering conduit 20 extending longitudinally from end to end thereof, each of said conduits 20 being connected by ports 21, Fig. 3, with one of the valve chambers. At one end of the engine the conduits 20 are connected by two pipes 22 with one end of a pipe 23 whose opposite end is connected with the outlet of a gear pump 24, the inlet of said pump being connected with one end of a pipe 25 communicating at its opposite end with the interior of the crank case 7 at a point below the level of the oil 8 contained therein. At the opposite end of the engine the conduits 20 are connected by two short pipes 26 with one end of a pipe 27 that is connected at its opposite end with the inlet of a flow impeding valve 28 whose outlet is connected by a pipe 29 with the interior of the crank case 7.

Any suitable means may be provided for driving the pump 24 while the engine is in operation, but, as herein shown said pump is driven by a belt 30 connecting a pulley 31 fast on crank shaft 2 with a pulley 32 fast on the shaft 33 of pump 24. Thus the pump is in operation only when the engine is running and its speed, and therefore its discharge, varies with the speed of the engine.

The flow impeding valve 28 comprises a valve proper 34 which closes toward conduits 20 and which is held upon its seat 35 by a spring 36 whose pressure can be regulated by means of an adjustable abutment screw 37 mounted in the cap of valve 28.

When the engine is in operation the pump 24 draws oil from crank case 7 and forces it up through pipes 23 and 22 into and through conduits 20 and thence through pipes 26 and 27, valve 28 and pipe 29 back to crank case 7 again. While the oil is passing through the conduits the back pressure produced by the valve 28 causes some of said oil to discharge through ports 21 into the valve chambers, the rate of delivery through said ports varying with the speed of the engine, and the amount delivered during a given period of time for any given speed of the engine being determined by the adjustment of abutment screw 37.

In order to thoroughly distribute the oil forced into the valve chambers through ports 21 each valve is preferably made upon its exterior with spiral grooves 38 whose ends overlap as shown clearly in Fig. 3.

At one end the exhaust valve 6 is provided with a stem 39 to which is fixed a spiral gear 40 driven by a spiral gear 41 fast on a shaft 42. At its opposite end the exhaust valve 6 opens into an exhaust pipe 43. The inlet valve 5 is also provided at one end with a spindle 44 carrying a spiral gear 45 that is driven by the gear 41 while its opposite end is closed by a cap 46. This valve 5 may be connected with a gas supply as shown and described in my patent above referred to. The shaft 42 is driven through suitable means (not shown) by crank shaft 2.

The improvements above described not only provide a simple and efficient lubricating means for the rotary valves but the film of oil maintained around each valve serves to seal the joint between each valve and its housing.

While I have herein shown my invention as embodied in an apparatus for lubricating the bearing surfaces of the rotary valves of an internal combustion engine it is to be understood that my invention is not limited in this respect and that the invention may be embodied in apparatus for lubricating bearings of many different kinds.

What I claim is:—

1. In combination, a bearing; a movable member supported by said bearing; an oil circuit for delivering oil to said bearing; an oil reservoir in said circuit; an oil pump in said circuit having its inlet connected with the reservoir and its outlet connected with said bearing, and a constriction in said circuit for impeding the flow of oil from said bearing to said reservoir.

2. In a lubricating apparatus for rotary valves, in combination, a valve bearing; a rotary valve supported by said bearing; an oil circuit communicating with the interior of said bearing; an oil reservoir in said circuit; an oil pump in said circuit having its inlet connected with the reservoir and its outlet connected with said bearing, and means in said circuit for impeding the flow of oil away from said bearing.

3. In a lubricating apparatus for rotary valves, in combination, a valve bearing; a rotary valve supported by said bearing; an oil circuit communicating with the interior of said bearing; an oil reservoir in said circuit; an oil pump in said circuit having its inlet connected with the reservoir and its outlet connected with said bearing, and means in said circuit for yieldingly impeding the flow of oil away from said bearing.

4. In a lubricating apparatus for rotary valves, in combination, a valve bearing; a rotary valve supported by said bearing; an oil circuit communicating with the interior of said bearing; an oil reservoir in said circuit; an oil pump in said circuit having its inlet connected with the reservoir and its outlet connected with said bearing; means in said circuit for impeding the flow of oil away from said bearing, and means for regulating the action of said impeding means.

5. In an internal combustion engine, in combination, a cylinder; a valve housing having a port communicating with said cylinder; a rotary valve in said housing for controlling said port; an oil circuit communicating with the interior of said housing, said circuit including an oil reservoir; an oil circulating pump in said circuit; means for operating said pump, and means in said circuit for impeding the flow of the oil away from said housing.

6. In an internal combustion engine, in combination, a cylinder; a valve housing having a port communicating with said cylinder; a rotary valve in said housing for controlling said port; an oil circulating pump; means for operating said pump; an oil reservoir connected with the inlet of said pump; a conduit connected at one end with the outlet of said pump and at its opposite end with said reservoir, said conduit being connected by a port with the chamber of said valve, and means in said conduit between said port and the reservoir for impeding the flow of the oil back to said reservoir.

7. In an internal combustion engine, in combination, a cylinder; a rotary valve; a housing for said valve formed with an oil conduit connected by a branch port with the valve chamber thereof and also formed with a cylinder port that is controlled by said valve; an oil circulating pump having its outlet connected with one end of said oil conduit; means for operating said pump; an oil reservoir with which the opposite end of said conduit is connected; and means in said conduit between said branch port and reservoir for impeding the flow of the oil back to said reservoir.

8. In an internal combustion engine, in combination, a cylinder; a valve housing having a port communicating with said cylinder; a rotary valve in said housing for controlling said port; an oil circulating pump; means for operating said pump; an oil reservoir connected with the inlet of said pump; a conduit connected at one end with the outlet of said pump and at its opposite end with said reservoir, said conduit having a branch port communicating with the valve chamber of said housing, and means in said conduit between said branch port and the reservoir for yieldingly opposing the flow of oil back to said reservoir.

9. In an internal combustion engine, in combination, a cylinder; a valve housing having a port communicating with said cylinder; a rotary valve in said housing for controlling said port; an oil circulating pump; means for operating said pump; an oil reservoir connected with the inlet of said pump; a conduit connected at one end with the outlet of said pump and at its opposite end with said reservoir, said conduit having a branch port communicating with the valve chamber of said housing, and a spring pressed valve in said conduit between said branch port and the reservoir for yieldingly opposing the flow of oil back to said reservoir.

10. In a multiple cylinder internal combustion engine, in combination, a plurality of cylinders; a valve housing having a plurality of ports, each communicating with one of said cylinders; a single rotary valve in said housing for controlling said ports; an oil circulating pump; means for operating said pump; an oil reservoir connected with the inlet of said pump; a conduit connected at one end with the outlet of said pump and at its opposite end with said reservoir, said conduit having a plurality of branch ports communicating with the valve chamber of said housing, and means in said conduit between said branch ports and the reservoir for impeding the flow of the oil back to said reservoir so as to produce an oil feeding back pressure.

11. In a multiple cylinder internal combustion engine, in combination, a plurality of cylinders; two valve housings each formed with a plurality of cylinder ports; two rotary valves for controlling said cylinder ports, each mounted within one of said housings; an oil circulating pump; means for operating said pump; an oil reservoir connected with the inlet of said pump; two conduits, each connected at one end with the outlet of said pump and at its opposite end with said reservoir and each made with a plurality of branch ports communicating with the valve chamber of one of said housings, and means between said branch ports and the reservoir for impeding the flow of the oil back to said reservoir so as to maintain an oil feeding back pressure.

Signed by me at Boston, Massachusetts, this 8th day of December, 1915.

WALTER M. CUSICK.

Witnesses:
ARTHUR F. RANDALL,
JOSEPH T. BRENNAN.

Copies of this patent may be obtained for five cents each, by addressing the "Commissioner of Patents, Washington, D. C."